(No Model.)
J. C. KULMAN.
COMBINED TAPE LINE AND SHEARS.
No. 259,556. Patented June 13, 1882.
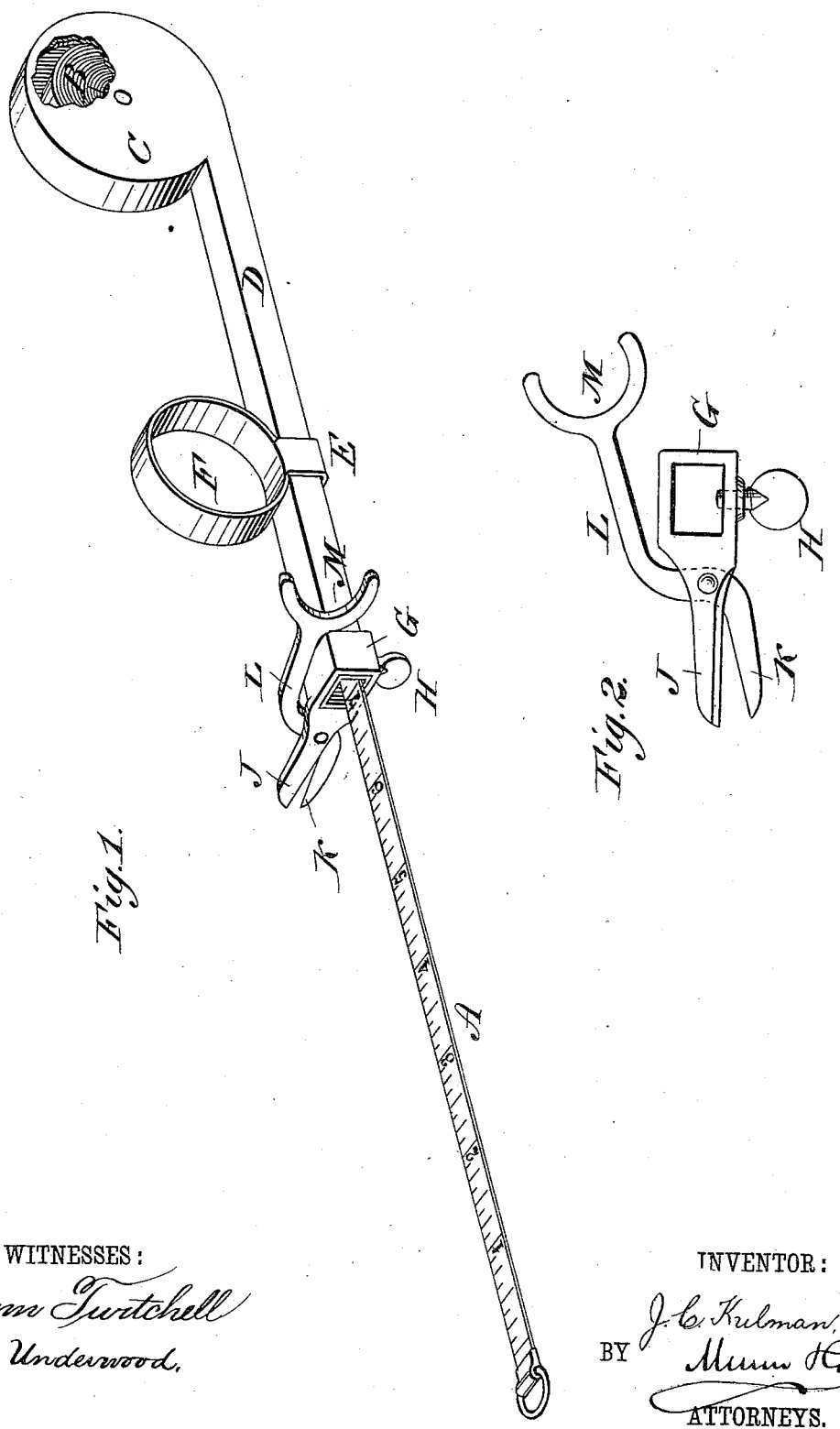
WITNESSES:
Dom Twitchell
B. G. Underwood,
INVENTOR:
J. C. Kulman,
BY Munn &Co
ATTORNEYS.

United States Patent Office.

JOHN C. KULMAN, OF MARSHALL, ILLINOIS.

COMBINED TAPE-LINE AND SHEARS.

SPECIFICATION forming part of Letters Patent No. 259,556, dated June 13, 1882.

Application filed February 21, 1882. (No model.)

*To all whom it may concern:*

Be it known that I, JOHN CHARLES KULMAN, of Marshall, in the county of Clark and State of Illinois, have invented a new and Improved Combined Measure and Shears, of which the following is a full, clear, and exact description.

The object of my invention is to facilitate measuring and cutting off pieces of ribbons, cloth-trimmings, paper, and other like materials.

The invention consists in a tape-line case to which shears are attached, whereby when the tape-line has been drawn from its case the desired length a cut can be made in the edge of the cloth with the shears to show the desired length that is to be cut off of the material.

The invention further consists in a ring or finger-loop on a tubular projection of the tape-case for the purpose of facilitating holding the case; and the invention also consists in certain parts and details of construction, as will be fully described hereinafter.

Reference is to be had to the accompanying drawings, forming a part of this specification, in which similar letters of reference indicate corresponding parts in both t e figures.

Figure 1 is a perspective view of my improved combined measure and shears. Fig. 2 is a longitudinal elevation of the shears and the sleeve to which they are attached.

A graduated tape-line, A, is attached to a spring-reel, B, pivoted in a circular casing, C, which casing is provided with a squared or flattened tubular projection, D, the length of which is about equal to the width of a hand. The tape-line A passes through this hollow projection D, and has a ring or equivalent device for holding it at its outer end. A sliding sleeve, E, is mounted loosely on the projection D, and to the top of this sleeve E a ring or finger-loop, F, is attached. A squared sleeve, G, is passed over the end of the projection D, and is held on the same by a binding-screw, H. This sleeve G is provided with a shear-blade, J, projecting from the side of the sleeve, and to this blade J a shear-blade, K, is pivoted, which is provided with a handle part, L, provided at its end with a crutch-bar, M, into which the end of the thumb can be passed.

The shears J K can be made larger or smaller, as may be desired.

If desired, the tubular projection may be made short; but I prefer the construction shown.

As the sleeve G, to which the shears are attached, can be removed, the shears can be conveniently sharpened and adjusted.

The operation is as follows: The middle finger of the right hand is passed through the ring or finger-loop F and the end of the tape-line A is placed on the end of the piece of goods from which a certain length is to be cut off. The tape-line is then withdrawn until the end of the shears J K is a distance from the end of the tape-line and the end of the piece of goods equal to the desired length of the material to be cut off. By means of the thumb, which is placed into the crutch M, the shears J K are operated and a short cut is made in the edge of the material, and the material is then ripped across its width; or, if a ribbon or braid is to be cut, the shears J K are operated until they have cut through the ribbon, &c.

The goods can thus be measured and cut off much more rapidly with my improved device than with an ordinary yard-stick or tape-line and shears. As soon as the end of the tape-line is released the spring-reel B immediately draws and winds the tape-line into the casing C.

The ring or finger-loop F is made adjustable on the tubular projection D, so that it can be moved a greater or less distance from the end of the tubular projection, according to the size of the operator's hand.

Having thus described my invention, I claim as new and desire to secure by Letters Patent—

1. A combined measure and shears made substantially as herein shown and described, and consisting of a tape-line case having a tubular projection, to the end of which projection shears are attached, whereby the tape-line can be withdrawn and a cut made in the edge of the material at the end of the desired measured length, as set forth.

2. The combination, with the tape-line case C and the tape-line A, of the tubular projection D of this case C, and the shears J K, attached to the end of this tubular projection, substantially as herein shown and described, and for the purpose set forth.

3. The combination, with the tape-line case C and the tape-line A, of the tubular projection D, the shears J K on the end of this tubular projection D, and the ring or finger-loop F on this projection D, substantially as herein shown and described, and for the purpose set forth.

4. The combination, with the tape-line case C and the tape-line A, of the tubular projection D, the ring or finger-loop F, and the sleeve G, detachably mounted on the end of the tubular projection D, and of the shears J K, attached to the sleeve G, substantially as herein shown and described, and for the purpose set forth.

5. The combination, with the tape-line case C and the tape-line A, of the projection D and the shears J K on the end of the projection D, and of the crutch M on the handle end of the pivoted blade K of the shears, substantially as herein shown and described, and for the purpose set forth.

JOHN C. KULMAN.

Witnesses:
WILLIAM MAYERS,
H. B. DULANEY.